United States Patent [19]

Buchanan

[11] 4,347,744

[45] Sep. 7, 1982

[54] DIAPHRAGM TYPE DIFFERENTIAL PRESSURE GAUGE WITH OVERPRESSURE RELIEF PROTECTION

[75] Inventor: Steven O. Buchanan, Michigan City, Ind.

[73] Assignee: Dwyer Instruments, Inc., Michigan City, Ind.

[21] Appl. No.: 185,004

[22] Filed: Sep. 8, 1980

[51] Int. Cl.³ .................... G01L 13/02; G01L 19/06; F16K 13/04
[52] U.S. Cl. ........................................ 73/715; 73/431; 73/738; 73/716; 137/71; 137/68 R
[58] Field of Search .................. 73/715, 716, 738, 431; 137/71, 68 R

[56] References Cited

U.S. PATENT DOCUMENTS

| | | | |
|---|---|---|---|
| 2,194,420 | 3/1940 | Deming | 137/71 |
| 2,195,728 | 4/1940 | Jones et al. | 137/71 |
| 2,407,754 | 9/1946 | Williams | 137/71 |
| 2,722,837 | 11/1955 | Dwyer | 73/407 |
| 3,091,123 | 5/1963 | Locke | 73/407 |
| 3,201,992 | 8/1965 | Hoff, Jr. | 73/738 |
| 3,327,894 | 6/1967 | Ferris | 137/68 R |
| 3,373,614 | 3/1968 | Neyer | 73/716 |
| 3,375,718 | 4/1968 | Robinson et al. | 73/715 |
| 3,397,319 | 8/1968 | Locke | 250/231 |
| 3,645,140 | 2/1972 | Phillips et al. | 73/407 R |
| 3,834,580 | 9/1974 | Ludwig et al. | 137/68 R |
| 3,862,416 | 1/1975 | Phillips et al. | 250/231 P |
| 3,938,393 | 2/1976 | Morgensen et al. | 73/738 |
| 4,011,759 | 3/1977 | Phillips et al. | 73/407 R |
| 4,030,365 | 6/1977 | Phillips et al. | 73/393 |
| 4,051,730 | 10/1977 | Andrews et al. | 73/738 |

Primary Examiner—Anthony V. Ciarlante
Assistant Examiner—David V. Carlson
Attorney, Agent, or Firm—McWilliams, Mann & Zummer

[57] ABSTRACT

A sealed differential pressure gauge of the general type shown in Phillips and Zoludow U.S. Pat. No. 3,645,140 in which a sealed housing is provided that includes a flexible diaphragm that is to be exposed to differential pressures to operate a sensitive and accurate motion transmitting indicator device that is in the form of a pivotally mounted helix cooperating with a range spring mounted magnet, with the range spring being linked to the diaphragm so that the movement of the diaphragm, indicates differential pressures and changes thereof, operates the indicator device for reading of the gauge. The housing comprises a housing member and back plate therefor that, together with the rim portion of the diaphragm, are shaped to provide for blowout capability of the gauge that is rearwardly directed out of the back of the gauge should overpressures be experienced when the gauge is in operation. The housing at its front end includes a transparent cover through which the gauge dial is viewed that is threadedly connected to the housing member to provide increasing resistance to blowout through the face of the dial as pressures internally of the gauge are increased. The relationship of the helix, the wishbone mounting arrangement of the helix, the range spring mounted magnet, and the zero set mechanisms are revised to improve sensitivity, provide for ready recalibration and zero setting of the gauge, and increase the gauge operating range.

11 Claims, 18 Drawing Figures

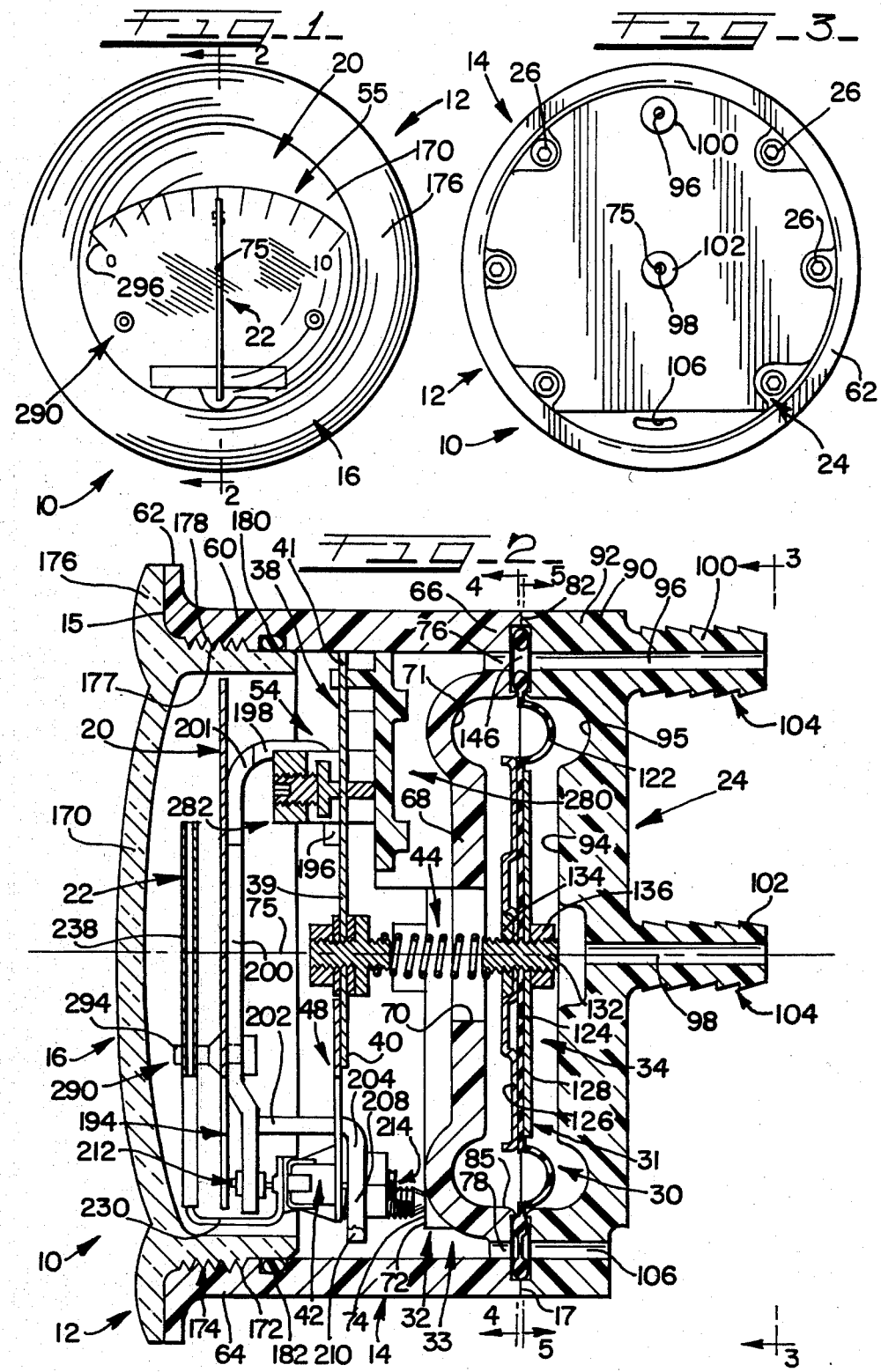

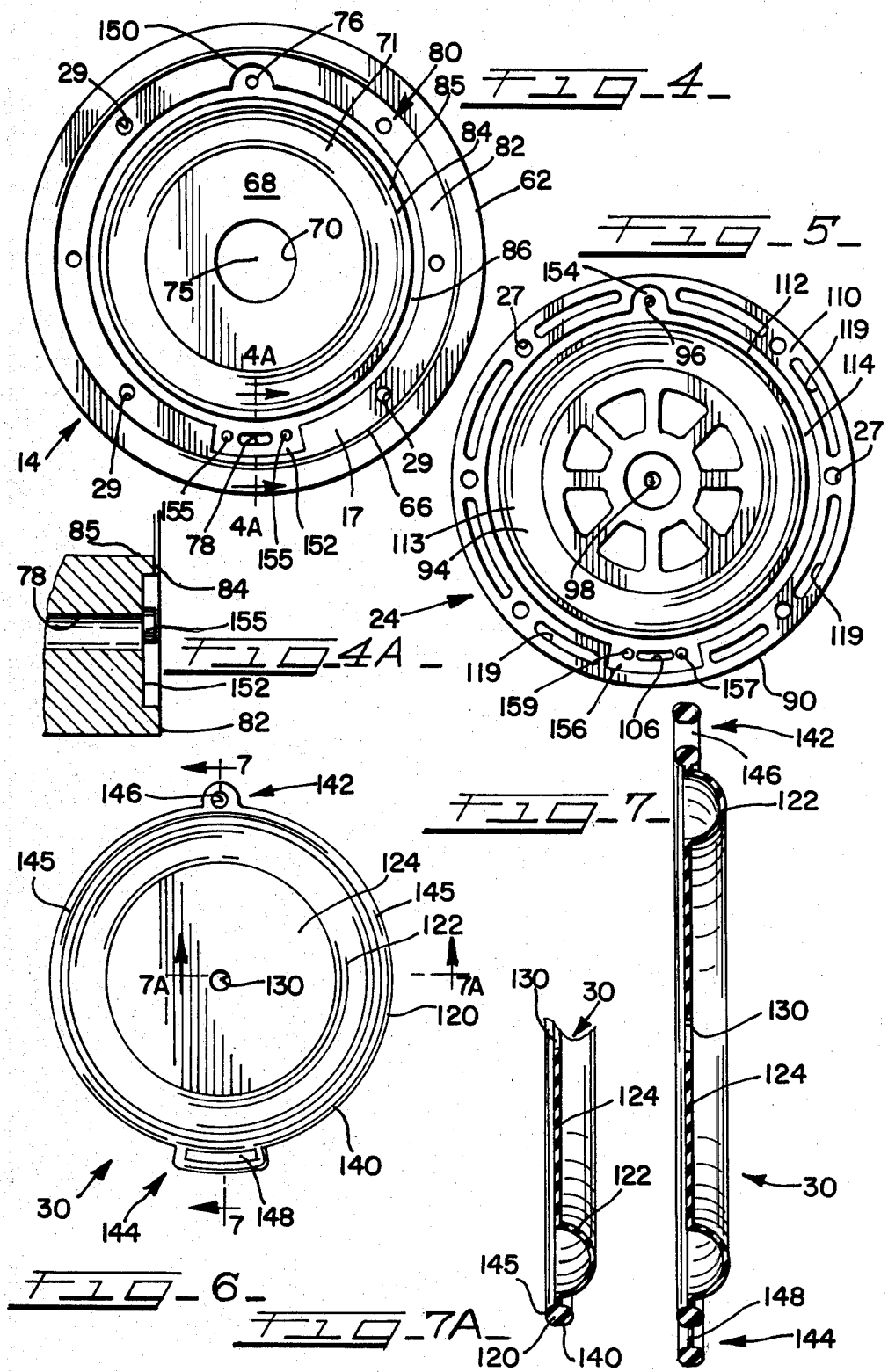

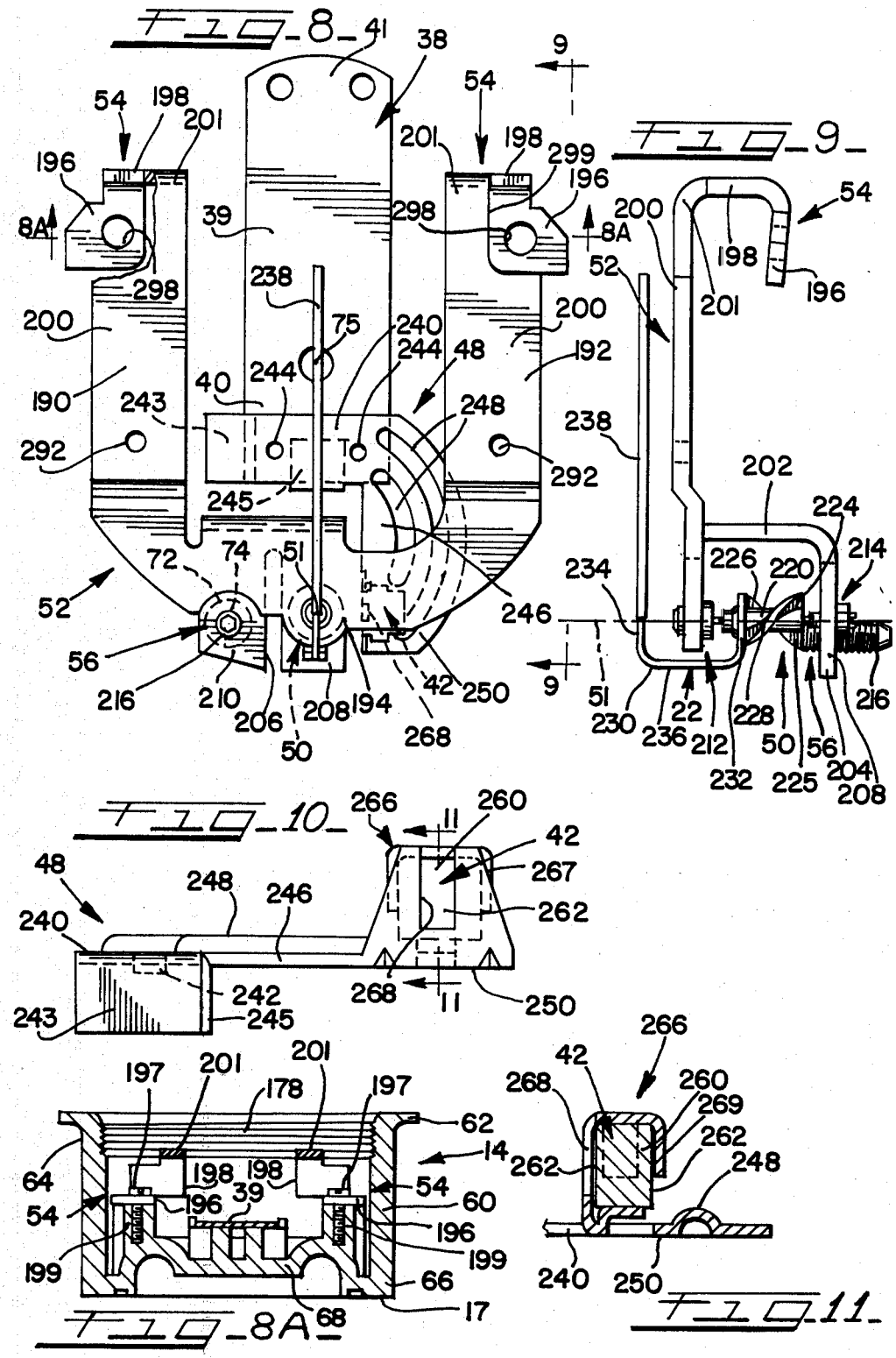

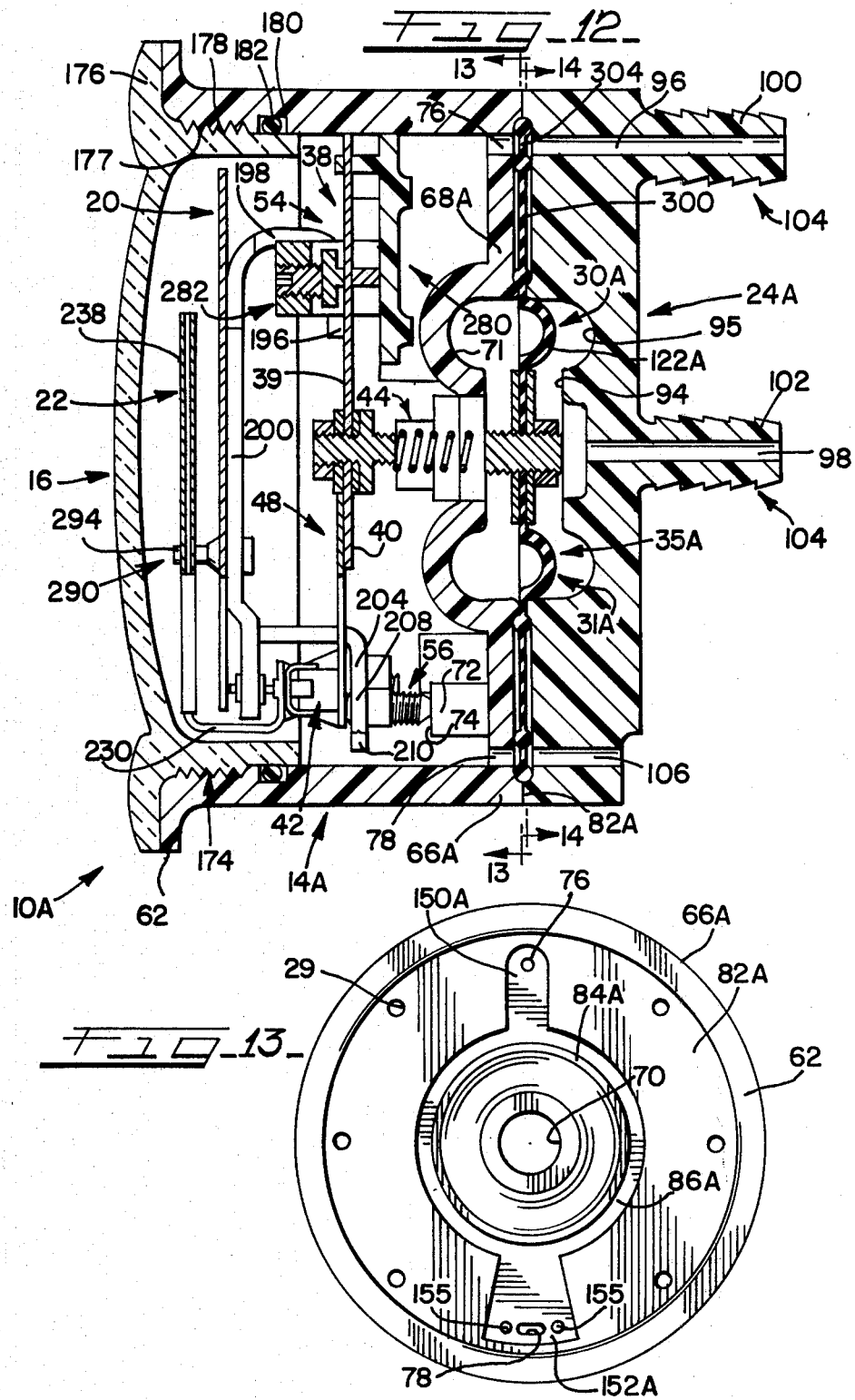

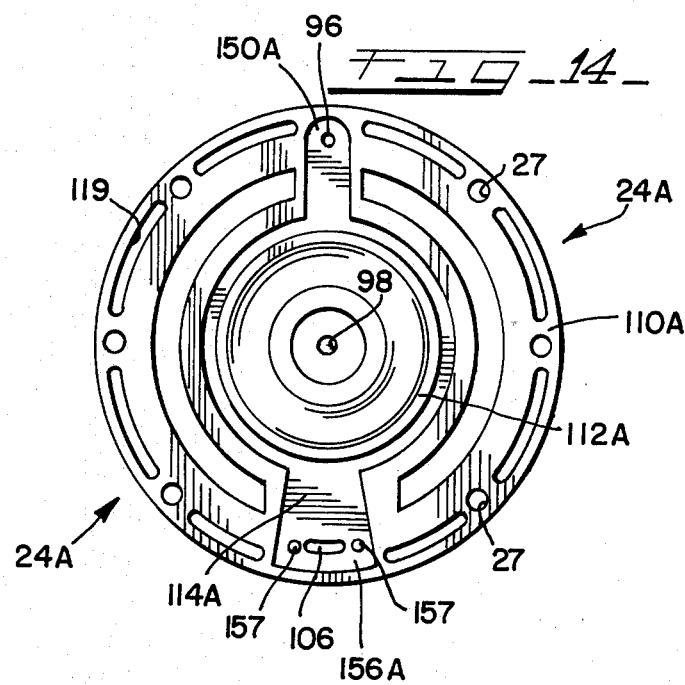
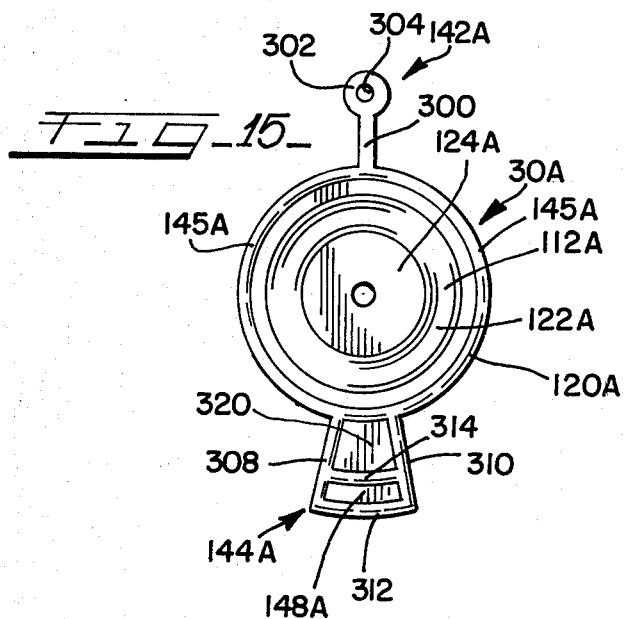

DIAPHRAGM TYPE DIFFERENTIAL PRESSURE GAUGE WITH OVERPRESSURE RELIEF PROTECTION

This invention relates to differential pressure gauges, and more particularly to seal type differential pressure gauges of the type shown in Phillips and Zoludow U.S. Pat. No. 3,645,140 and Phillips and Troyer U.S. Pat. Nos. 4,011,759 and 4,030,365. Gauges of this type include a flexible diaphragm that is to be exposed to differential pressures to operate a sensitive and accurate transmitting indicator mounted in the gauge housing. In the arrangements of the patents referred to, the motion transmitting device is in the form of a pivotally mounted helix cooperating with a range spring mounted magnet to indicate differential pressures and changes in same, by way of linear movement of the magnet through a linkage connection of the range spring to the diaphragm. The linear motion of the magnet is translated by the helix into rotary movement of the pointer carried by the helix that cooperates with the gauge dial that is equipped with scale indicia including a zero datum to which the pointer is to be set by the gauge zero set device.

Differential pressure gauges, in use, are occasionally subject to overpressure conditions, and where the gauge design is not arranged to avoid unintended blowout of the gauge due to the overpressures encountered, where blowout occurs it is likely to occur through the front or face of the gauge, with consequent danger of injury to the operator or technician monitoring the gauge. Experience in working and designing gauges of this type shows that it is not practical from the standpoint of economics to try to build into such gauges the strength needed to resist all levels of overpressure likely to be experiences in use. Consequently, the need has existed to arrange the gauge so that in the event unintended blowout occurs, the blowout action will be directed elsewhere other than where the observing technician might be positioned to read the gauge.

Furthermore, the helix employed in motion transmitting devices of the type indicated generally involve one or two helically contoured flanges in a full turn about a spindle that forms the helix shaft to balance the helix. Experience has shown that occasionally under overpressure conditions, the helix will over rotate and magnetically shift to an out of phase relationship with respect to the gauge magnet and dial that cannot be corrected without disassembling the gauge to physically reposition the helix.

Experience in working with gauges of this type that are designed specifically for low differential air pressure use has also revealed the importance of minimizing inertia in the operation of the helix and pointer, and providing for ready and accurate zero adjust of the helix and pointer.

A principal object of this invention is to provide a gauge of the type indicated that is arranged to, when blowout occurs, direct the blowout to the rear of the gauge while resisting blowouts through the face of the gauge.

Another principal object of the invention is to revise the relationship of the gauge helix, magnet, the wishbone mounting arrangement for the helix, and the zero set mechanisms to improve sensitivity and increase operating range.

Another important object of the invention is to provide a removable front cover arrangement for the gauge that permits ready access to the gauge working parts for recalibration and replacement of the gauge scale, and while in place, enable the gauge to offer increased resistance to front blowout without having to increase the dimensions of the parts involved.

Still another object of the invention is to provide a differential pressure gauge of the type indicated that is economical of manufacture, that is sensitive and accurate in use, that allows ready disassembly for ease of repair and replacement of parts in the factory or in the field, and that is long lived and efficient in operation.

In accordance with the invention a differential pressure gauge is provided comprising a housing having a pressure cavity defined thereby across which is mounted a flexible diaphragm that separates high and low pressure chambers in the gauge, a leaf spring disposed in the housing in overlying relation to the diaphragm and being anchored to the housing cantilever fashion at one end thereof, and mounting a magnet at the other end thereof, a helix mounting wishbone frame disposed in the housing and having its arms anchored to the housing cantilever fashion to define a projecting, movable bight portion on which the magnetically operated helix is journalled, with the helix being disposed so that its axis of rotation extends substantially normally of the plane of the leaf spring. The diaphragm and leaf spring are coupled together whereby the deflection of the diaphragm under differential pressures in the gauge chambers and changes therein produces linear movement on the leaf spring at its magnet mounting end whereby the helix is rotated to appropriately position the gauge indicator arm that is carried by the helix with respect to the gauge scale, for scale reading purposes.

The gauge housing is in the form of a housing member having a back or bottom plate member and a screw-in cover formed from a transparent material that is arranged to resist blowout through the front of the gauge. The gauge housing member and back plate are secured together to clamp the diaphragm in its operating position, and in accordance with the invention, the diaphragm marginal rim portion and the corresponding surfaces of the housing member and back plate engaging same are formed to provide for overpressure relief protection by way of fluid blowout through the back of the gauge when overpressures are experienced.

The gauge wishbone, helix, helix pointer arm, and the helix zero adjust are arranged to improve sensitivity and increase the operating range. The gauge removable front cover provides ready access to the gauge interior for recalibration and replacement of the scale, and the threaded engagement of the cover with the gauge housing member offers effective resistance to pressure build ups in the gauge that avoid blowout through the gauge front.

Other objects, uses, and advantages will be obvious or become apparent from a consideration of the following detailed description and the application drawings in which like reference numberals indicate like parts throughout the several views.

In the drawings:

FIG. 1 is a top plan view of a preferred embodiment of the invention;

FIG. 2 is a sectional view through the gauge, along its central axis, taken along line 2—2 of FIG. 1, showing some parts, such as the magnet, in elevation, and other parts, such as the magnet mounting bracket and the pointer, in partial section or broken away, and illustrating the gauge as arranged for low pressure range use;

FIG. 3 is a bottom or back plan view of the gauge;

FIG. 4 is a bottom plan view of the gauge housing member per se, with the back plate, diaphragm, range spring, and associated part omitted;

FIG. 4A is a fragmental sectional view substantially along line 4A—4A of FIG. 4, and on an enlarged scale, bringing out a detail of construction;

FIG. 5 is a top plan view of the gauge housing back plate, as it would appear if separated from the gauge housing member and diaphragm;

FIG. 6 is a top plan view of the diaphragm per se;

FIG. 7 is a sectional view of the diaphragm, taken substantially along line 7—7 of FIG. 6, and shown on an enlarged scale;

FIG. 7A is a fragmental sectional view of the diaphragm, taken along line 7A—7A of FIG. 6, and on the same scale as that of FIG. 7;

FIG. 8 is a top plan view of the gauge helix-wishbone subassembly, shown as positioned relative to the gauge leaf spring and the magnet it mounts in the assembled relation of FIG. 2, illustrating how these components are operatively associated in the gauge as shown in FIG. 2, and with a portion of the wishbone broken away;

FIG. 8A is a diagrammatic fragmental sectional view taken through the gauge housing member, wishbone, and range spring as viewed along line 8A—8A of FIG. 8;

FIG. 9 is a side elevational view of the helix-wishbone assembly shown in FIG. 8;

FIG. 10 is a side elevational view of the magnet mounting bracket as shown in FIG. 8, taken from the left hand side of FIG. 8, and with the helix-wishbone subassembly omitted;

FIG. 11 is a fragmental sectional view taken substantially along line 11—11 of FIG. 10;

FIG. 12 is a view similar to that of FIG. 2 but illustrating the gauge modified for high range use;

FIG. 13 is a bottom plan view of the gauge housing member of FIG. 12, with the back plate, diaphragm, range, spring, and associated parts omitted;

FIG. 14 is a top plan view of the back plate member of the gauge of FIG. 12, showing the back plate as removed from the gauge; and diaphragm and FIG. 15 is a plan view of the diaphragm of the FIG. 12 embodiment.

However, it is to be understood that the specific drawing illustrations provided are supplied primarily to comply with the requirements of the Patent Laws, and that the invention is susceptible of modifications and variations that will be obvious to those skilled in the art, and which are intended to be covered by the appended claims.

GENERAL DESCRIPTION

Reference numeral 10 of FIGS. 1-3 generally indicates a differential pressure gauge arranged in accordance with the present invention for low pressure range use (from about one-half inch water column to about twenty inches of water column) and comprising a housing 12 that includes a basic housing member 14 that has applied to the front or upper side 15 of same a transparent cover 16 through which is visible the dial plate 20 of the gauge 10, with which the gauge pointer arm 22 cooperates.

On the back or bottom side 17 of the housing member 14 is back or base plate 24. The housing member 14 and back or base plate 24 are in the form of separate castings shaped in the manner indicated in the drawings (important specifics of which will be described in detail hereinafter) and adapted for securement together by employing suitable screws 26 that are received in openings 27 formed in the base plate 24 for this purpose and that are threaded into correspondingly located threaded openings 29 formed in the housing member 14 for this purpose, with these routine structural features being largely omitted from the drawings, although their location is indicated by the showing of FIG. 3.

The gauge 10 is of the general type shown in said U.S. Pat. Nos. 3,645,140 and 3,862,416, and thus includes a diaphragm 30 mounted between the housing member 14 and base plate 24 in the special manner that will be described in detail hereinafter. The housing member 14 and the base or back plate 24 are shaped to define a pressure cavity 32 across which the diaphragm 30 is mounted to define the pressure cavity 32 into separate pressure chambers 33 and 34 on either side of the diaphragm 30, of which the upper chamber 33 is the high pressure chamber and the lower chamber 34 is the low pressure chamber in the gauge 10.

The gauge 10 includes range spring 38 that is in the form of leaf spring 39 that is suitably cantilever mounted at its end 41 within the cavity 32, and specifically within the chamber 33, to support magnet 42 (see FIGS. 8 and 10) from its projecting end 40. The range spring 38 is connected to the diaphragm 30 by a suitable linkage 44 of the type shown in Phillips and Troyer U.S. Pat. No. 4,030,365 so that variations in pressure in the respective chambers 33 and 34 will be translated by corresponding movement of the diaphragm 30 into movement of the leaf spring 39 and specifically at the free end 40 of the leaf spring 39 to which the magnet 42 is mounted. Magnet 42 is mounted on the leaf spring end 40 employing the novel angle bracket 48 that is illustrated in FIGS. 8, 10 and 11 for disposing the magnet 42 in operative magnetic coupling relation to helix 50 that is journalled for rotation about its longitudinal axis 51 in support frame 52 that is of the wishbone type, which frame 52 is cantilever mounted at its leg portions 54 by appropriate securement to the housing member 14 using screws or the like, to support the helix 50 for movement to the right or to the left of FIG. 2 relative to the housing member 14.

The pointer arm 22 is arranged and fixed to the helix in accordance with the specifics of the present invention and has the function of cooperating with the scale 55 (see FIG. 1) that is suitably formed on dial plate 20 to give the desired differential pressure reading. The helix 50 moves to shift the pointer arm 22 on movement of the magnet 42 to the right or to the left of FIG. 2 under the action of differential pressures in the chambers 33 and 34, or on movement of the wishbone frame 52 relative to the housing member 14 by operation of zero adjust device 56 (see FIGS. 8 and 9) that is arranged in accordance with the present invention (and as hereinafter described).

Overpressure Blow Out Protection

An important feature incorporated in gauge 10 is the arrangement of the housing member 14, back plate 24 and diaphragm 30 to insure overpressure relief protection by way of fluid blowout from the back side of the instrument, when that occurs under significant overpressure conditions. This is achieved by special shaping of these components and the particular nature of the cover 16 that is employed and its securement to the housing member.

The housing member 14 is formed from a suitable stress resistant plastic material such as the LEXAN polycarbonate resin made and sold by Plastics Business Division of General Electric Company. Housing member 14 comprises cylindrical side wall 60 that is flanged as at 62 at its front or upper end 64 and that is integral at its back or bottom end 66 with floor 68 that is apertured as at 70 to receive the linkage 44 and that is recessed as at 71 to accommodate possible deflection of the diaphragm. The housing member floor or bottom wall 68 also includes at its top, circular abutment 72 (located to one side of the floor recess 71) that defines the upwardly facing fixed planar surface 74 with which the zero adjust device 56 is associated in centered relation thereto, a will be described hereinafter in detail, and which lies in a plane that is normal to the central axis 75 of housing member 14, and gauge 10. Housing member 14 at its back end 66 is formed with high pressure inlet passage 76 (see FIG. 2) at one side of same, and blowout passage 78 in a substantially diametrically positioned location, substantially as indicated in FIGS. 2 and 4. The back end 66 of the housing member 14 is shaped to define a planar end surfacing 80 (see FIG. 4) that includes an outer annular planar surface 82 and an inner annular planar surface 84 about the outer margin 85 of recess 71 (disposed somewhat below the level of surface 82 [inwardly of housing member], see FIG. 4A), that are separated by diaphragm rim receiving planar recess or indentation 86. As indicated in FIG. 4, the threaded openings 29 to which the screws 26 are respectively applied are centered within the area of the surface 82 (that forms back side 17 of housing member 14).

The back or base plate 24 is formed from the same material as housing member 14, and is in the form of a disc member 90 defining cylindrical side wall 92 that has the same outer diameter as housing member side wall 60; the disc member 90 on the inside surfacing of same is conventionally recessed as at 94 and 95 to accommodate deflection of the diaphragm 30. Disc member 92 defines high pressure passage 96 and low pressure passage 98 that extend therethrough, and in the specific form illustrated, the disc member 92 is formed to define the respective high and low pressure studs 100 and 102 through which the respective passages 96 and 98 extend, with the studs 100 and 102 being shown conventionally shaped as indicated at 104 to frictionally receive plastic tubing or the like and resist withdrawal of the tubing from same (external threading for threaded connections is alternately employed).

The disc member 92 is also formed to define blowout passage 106, with the arrangement being such that when the back plate 24 is mounted in its operating position, the high pressure passage 96 of same is aligned with high pressure passage 76 of the housing member and the blowout passage 106 of the back plate is aligned with the blowout passage 78 of the housing member.

The disc member 92 on its front side is formed to define planar annular surface 110 (see FIG. 5) that is to oppose the surface 82 of the housing member, which is separated from annular planar surface 112 that is formed about the margin 113 of recess 94 (and that is to oppose surface 84 of the housing member), by planar recess 114 that opposes the corresponding housing member recess 86 in the assembled relation of the device, with the diaphragm interposed therebetween. Surface 112 of the back plate 24 is indented somewhat below surface 110, in a manner comparable to the showing of surfaces 82 and 84 in FIG. 4A) and opposes edge surface 84 in the gauge assembled relation (see FIG. 2). Back plate 24 is formed with section reducing arcuate indentations 119 between the respective bolt holes 24 to minimize material needs to form the back plate 24.

The diaphragm arrangement is generally illustrated in FIGS. 2, 6 and 7, and it may be formed from any suitable material, such as neoprene or silicone rubber. In the special form illustrated, the diaphragm 30 comprises rim portion 120, annular flexing indentation 122 that is adjacent the rim portion 120 and a central disc like portion 124. As indicated in FIG. 2, the diaphragm 30 in use is part of a diaphragm assembly 31 of the type shown in Phillips and Troyer U.S. Pat. No. 4,030,365 and thus includes front plate 126 and back plate 128 that rigidify the diaphragm central portion 124 for low pressure applications. Diaphragm 30 includes a central aperture 130 that receives threaded stud 132 and its associated parts 134 and 136 that are turned against the respective plates 126 and 128 to assemble the diaphragm assembly 31.

In accordance with the present invention, the rim portion 120 of the diaphragm 30 is of special configuration. Rim portion 120 is formed in the nature of a continuous bead 140 about the marginal edging of the diaphragm 30 and has a thickness dimension transversely of the diaphragm that is a selected multiple of the thickness of the diaphragm central portion 124 (four times such thickness in a successful embodiment of the invention). The rim portion defining bead 140 is formed to define special protuberances 142 and 144 that are best shown in FIGS. 6 and 7 and that are separated by rounded ridge or rib segments 145 that are integral therewith. The protuberance 142 is semi annular in configuration and shaped to define a centrally located aperture 146 that is intended to provide communication between the high pressure passages 76 and 96 when the gauge is assembled.

Protuberance 144, on the other hand, is of elongated configuration circumferentially of the diaphragm rim 120 and is shaped to define within the protuberance 144 imperforate but frangible membrane 148 of film thickness dimensions that has the function of blocking communication between the blowout passages 78 and 106 of the gauge when the gauge is assembled and experiencing normal pressure conditions in use.

As indicated in FIG. 2, assuming that the diaphragm assembly 31 has been assembled and the back plate 24 is to be applied to the bottom end 66 of housing member 14, the diaphragm 30 is applied between the housing member 14 and the back plate 24 with its rim portion 120 seated in recesses 86 and 114 and its aperture 146 of protuberance 142 aligned with high pressure passageways 76 and 96 of the gauge, and its protuberance 144, and in particular the membrane 148, centered on blowout openings 78 and 106. As indicated in FIGS. 4 and 5, the recess 86 of the housing member 14 is formed to define a notch 150 that receives the diaphragm protuberance 142, and an elongated notch 152 that receives the diaphragm protuberance 144. Similarly, the recess 114 of the back plate 24 is formed to define a notch 154 to receive the diaphragm protuberance 142 and an elongated notch 156 to receive the diaphragm protuberance 144.

Thus, the rim portion 120 on the upwardly facing side of the diaphragm 30 is shaped for press fitting relation into the correspondingly shaped recess 86 of the housing member 14, while the underside of the rim portion 120 is shaped for press fitting relation into recess 114 of the back plate 24. The housing member 14 in its notch 152 defines a pair of spaced apart low upstanding studs 155, and back plate 24 in its notch 156 defines correspondingly located low upstanding studs 157, disposed to either side of the respective passages 78 and 106, for centering the diaphragm protuberance relative to the respective notches 152 and 156. The studs 155 and 157 have their upper ends located just below the levels of the respective surfaces 82 and 110, so as to be spaced apart in the gauge assembled relation a distance that exceeds the thickness of membrane 148 that will be disposed therebetween (see FIG. 4A).

As FIGS. 4, 5, and 6 indicate, the diaphragm protuberance 144, its membrane 148, and blowout passages 78 and 106 are not of circular or annular configuration, but rather are arcuate on a radius struck about the central axis 75 of the gauge. This is for the purpose of having the effective orifice areas defined by the passages 78 and 106 larger than the corresponding orifice areas of the passages 76 and 96. In a preferred embodiment, the ratio involved should be on the order of two or three to one, and in the illustrated embodiment this is achieved by the arc shaped configuration that is given to the passages 78 and 106 (see FIGS. 4 and 5); the same general configuration is involved in diaphragm protuberance 144 and its membrane 148 (see FIG. 6). In a practical embodiment of the invention, the frangible or rupturable membrane 148 has a thickness that is approximately one-third the thickness of the diaphragm central portion 124 and approximately one-tenth of the thickness of the rim portion 120, so that the gauge 10, when excessive overpressures are encountered in use, the pressures of the high pressure chamber 33 will rupture membrane 148 for relief of the overpressure and by way of fluid blowout of the gauge through its back side.

The application of screws 26 to secure the back plate 24 to the housing member 14 with diaphragm 30 interposed therebetween draws these parts firmly together to effect hermetic sealing of the gauge about and along diaphragm rim portion 120, except at aperture 146, as indicated in FIG. 2.

The cover 16, which may be formed from a suitable high impact acrylic material or its equivalent of transparent characteristics, is of dished configuration defining imperforate transparent wall 170, depending side wall 172 (see FIG. 2) that has threaded connection 174 to housing member 14, and circumambient flange portion 176 that seats against the end flange 62 of the housing member.

The threaded connection 174 is of special significance insofar as the gauge's resistance to front blowout is concerned. Thus, the cover side wall 172 is externally threaded as at 177 with V threads while the housing member 14 is internally threaded as at 178 with correspondingly shaped V threads. Housing member 14 is formed to define annular recess 180 in which suitable O-ring seal 182 is lodged in sealing relation between the housing member 14 and cover side wall 172.

The shaping of the threading 174 is such that as stress builds up on cover 16 due to pressure build ups in high pressure chamber 33 (which is in part defined by cover 16), the loading of the threading and their resistance to dislodgement of the cover 16 from the gauge increases, thereby providing increased pressure resistance capacity without having to increase the thickness of the parts involved.

The Helix and the Support and Actuator Therefor

Referring now more particularly to FIGS. 8–11 in conjunction with the showing of FIG. 2, the wishbone frame 52 is in the form of a pair of arms 190 and 192 that are integrally united at the frame bight portion 194 to form the general wishbone configuration of the frame. Arms 190 and 192 at the anchored ends 54 of the frame 52 are of reverse bend configuration each defining a lower foot 196 that is anchored to the housing member 14 using suitable screws 197 or the like applied to pedestals 199 defined by housing member 14 for this purpose (see FIG. 8A), an upstanding leg 198 surmounted by a resiliently flexible knee portion 201 that merges into generally planar body portion 200. The body portions 200 overlie the respective feet 196 and extend for merger into the frame bight portion 194.

The frame 52 and its bight portion 194 is shaped to define depending flange 202 that terminates in a planar platform section 204 that is bisected by notch 206 (see FIG. 8) to define parallel portions 208 and 210 which are in substantial parallelism with the arm body portions 200. Helix 50 is suitably journalled between mounting platform portion 208 and the frame bight portion 194, by employing suitable journalling devices where indicated at 212 and 214, which journal helix 50 for free rotational movement about its longitudinal axis 51.

The mounting platform section 210 threadedly mounts set screw 216 that forms the zero set device 56 and cooperates with the housing member fixed surface 74 of abutment 72, on which set screw 216 is centered, as suggested by FIG. 8.

The helix 50 itself comprises central spindle portion 220 having a pair of oppositely positioned spirally contoured flanges 224 and 225 that respectively define the respective helically contoured edges 226 and 228. The helix 50 is of special significance in that its flanges 224 and 225 are spiralled only a half turn about the helix.

Pointer 22 in the illustrated embodiment is of special construction to improve the sensitivity of the device and comprises a U-shaped base frame member 230 shaped to define parallel legs 232 and 234 joined by stanchion or post 236. The end 232 of the frame 230 is enlarged and apertured for reception on and affixing to the helix 50, as by employing a suitable bonding material, while the end 234 of the frame 230 frictionally receives elongate tube 238 to complete the pointer 22.

It is a feature of the invention that the mass of the pointer frame 230 and tube 238 are proportioned on either side of the helix pivot axis 51 for balanced mass relationships. Thus, the mass of the frame 230 on one side of the axis 51 is made roughly the equivalent of the mass of the tube 238 and the parts of frame 230 on the other side of axis 51 to minimize the inertia on the pointer that would tend to inhibit rotation of the helix under the linear movement of the magnet that is involved in devices of this type. The tubular nature of the tube 38 and its formation from a light weight material such as aluminum permits the tube 238 to give the pointer 22 the reach across dial plate 20 that is essential for devices of this type.

Bracket plate 48 that mounts magnet 42 is of special right angled configuration formed from aluminum and comprises a base portion 240 (see FIGS. 8 and 10) that is suitably formed with a pair of tubular projections 242

(the formation of which leave apertures 244 in bracket plate 48), which projections fit into correspondingly located apertures (not shown) formed in the leaf spring end 40 for mounting the bracket plate 48 on the leaf spring end 40; these parts are fixed together by folding the two perpendicularly oriented flanges 243 and 245 into engagement with the underside of the leaf spring 39, as indicated in FIG. 8. It will be noted that holding flange 245 is centered on the leaf spring end 40, while flange 243 underlies one side of the leaf spring end 40, in the applied relation of bracket plate 48. In the showing of FIG. 10, flanges 243 and 245 are illustrated in their unfolded positions.

The bracket plate 48 includes right angled extension arm 246 that in the form shown has suitable strengthening ribs 248 which extend to the projecting end 250 of the arm 246 on which the magnet 42 is mounted.

The magnet 42 is preferably of the type disclosed in Phillips and Troyer U.S. Pat. Nos. 4,011,759 and 4,030,365, and thus is in the form of body 260 of parallelepiped configuration that is formed from a suitable high energy product material, such as the Samarium Cobalt (using powdered metal formulation techniques) product sold under the trademark HICOREX by Hitachi Magnetics Corp. of Edmore, Mich. An energy product in the range of from about 14 to about 18 million gauss.oersteds is preferred.

The magnet 42 thus defines oppositely facing pole faces 262, one of which is disposed in close adjacency to the helix following the teachings of said Phillips and Troyer patents. For this purpose, bracket plate 48 at its end 250 is shaped to define a suitable mounting enclosure 266 for the magnet 42 that defines window opening 268 through which the pole face 262 that cooperates with the helix 50 faces the helix in the manner suggested in FIG. 8. The enclosure 266 includes bending flanges 267 and 269 that are bent or deformed against the magnet 42 to hold it in mounted position, after the magnet 42 has been disposed in its enclosure 266.

Bracket plate 48 thus mounts the magnet 42 at one side of helix 50, and is arranged to provide for ready mounting of the magnet in its enclosure accurately positioned relative to window opening 268, and ready mounting of the bracket plate 48 on leaf spring end 40 with the orientation required to give magnet 42 its needed working relationship with helix 50.

The leaf spring 39 is suitably cantilever mounted at its end 41 by employing suitable screws or the like to anchor same to the housing member 14; the live length of the leaf spring 39 is controlled by a clamp device 282 of the type shown in Locke U.S. Pat. No. 3,397,319.

The dial plate 20 may be of any suitable type and in the form diagrammatically illustrated, it is apertured to be secured to the wishbone frame 52 by commercially available fasteners 290 that are formed from resiliently compressible material such as rubber, and are of rivet style configuration, for force fitting into wishbone apertures 292 and the correspondingly located apertures formed in the dial plate (not shown) for this purpose. The particular fasteners 290 illustrated have upstanding ends 294 that serve as bumpers for the pointer 22. Scale 55 is suitably imprinted on dial plate 20 and includes the usual datum zero line indicia 296.

In assembling the wishbone frame 52 to the housing member 14, assuming that the leaf spring 39 and the magnet it carries have been applied to the housing member 14 as indicated, and the helix 50 and pointer 22 have been applied to wishbone frame 52, the feet 196 of the wishbone frame are applied against the housing member pedestals 199 that they seat against, with screws 197 being applied to the feet apertures 298 through the space provided by the excised sides 299 of the frame knee portions 198. Set screw 216 is applied to mounting platform section 210 and turned relative thereto and against the housing member fixed surface 74 to dispose the wishbone frame in substantially the relationship relative to the range spring 38 that is indicated in FIG. 2. In this position, the pole face 42 should be substantially midway along the length of helix 50, with the pointer 22 being oriented so that a minor amount of threading of the set screw 216 is all that is needed to position the pointer 22 on the zero datum 296 defined by dial plate 20. The shaping of the wishbone frame feet 196 of legs 198 is such that so positioning of the helix 50 and pointer 22 provides a downward bias acting on the wishbone frame bight portion 194 that maintains the set screw 216 seated against fixed surface 74, with the threading of the set screw 216 in either direction moving the wishbone frame relative to magnet 42 as needed to at any time reset the pointer 22 on the datum zero or similarly set it on replacement dial plates for recalibration purposes.

The half turn nature of the helix flanges 222 and 224 insures that the helix 50 in use will not overrotate to the point that it shifts magnetically out of phase relative to the magnet. This out of phase shifting sometimes occurs in gauges equipped with helixes that have full 360 degree turns, when overpressures are encountered.

As disclosed in said Phillips and Troyer patents, the helix 50 may be of either the dual (as illustrated) or single lobe or flange type.

It will therefore be seen that the invention provides a differential pressure gauge having a number of significant improvements. An important advantage lies in the arrangement of the gauge so that when excessive overpressures occur within the gauge, blowout is through the rear of the gauge, by way of rupture of the blowout membrane 148 of the diaphragm 30 that is provided for this purpose. In addition, the special interaction of the gauge cover 16 and housing member 14 insure that the cover 16 will remain in place on the gauge housing member when blowout occurs.

The zero set adjustment of the gauge is readily accomplished by merely removing the cover 16, which also permits ready changing of the datum plate for scale replacement and recalibration.

The general nature of the gauge allows ready disassembly of the gauge housing parts to replace the diaphragm for ease of repair in the factory or in the field. The specific improvements in the wishbone frame and the products cooperating with same that provide the linear to rotary motion transforming means involve improve sensitivity and performance.

Modified Embodiment

Referring now specifically to the varient embodiments of the invention shown in FIGS. 12-15, the gauge 10A is basically the same as gauge 10, but has its housing member 14A, back plate or cover 24A, and diaphragm assembly 31A arranged for high pressure range operation (from about twenty inches water column to about fifteen psi).

For this purpose, the housing member bottom wall or floor 68A and the back or cover plate 24A are shaped to accommodate a diaphragm 30A of reduced effective diameter, including a flexing indentation 122A of shorter annular diameter within the diaphragm working cavity 35A.

The housing member lower or back end 66A is shaped as indicated in FIG. 13 to define annular planar surface 82A that is separated from planar annular surface 84A that is a level below the level of surface 82A (inwardly of housing member 14A). Surfaces 82A and 84A are separated by the diaphragm receiving planar recess 86A that serves the same function as corresponding recess 86 of FIG. 4.

Similarly, the top side of back plate 24A is formed with planar surface 110A that is comparable to surface 110 of back plate 24, and planar surface 112A that is comparable to corresponding surface 112 of FIG. 5, these being separated by planar recess 114A in which the diaphragm 30A is received in a manner comparable to the corresponding parts of the gauge 10.

The diaphragm 30A is shown in top plan in FIG. 15 and comprises marginal rim portion 120A that is comparable to the rim portion 120 of the diaphragm 30, flexing indentation 122A that is comparable to the corresponding flexing indentation 122 of gasket 30, and relatively flat central portion 124A that is comparable to the corresponding central portion 124 of the diaphragm 30.

The diaphragm 30A includes rim portion protuberance 142A, that is comparable to protuberance 142 of diaphragm 30, marginal rim protuberance 144A that is comparable in function to the protuberance 144 of diaphragm 30, and rounded ridge or rib segments 145A that are comparable to segments 145 of diaphragm 30.

The diaphragm protuberance 142A is in the form of a shank 300 that is integral with annulus 302 which defines aperture 304 that provides communication between the high pressure passages 76 and 96 of the housing member 14A and back plate 24A, respectively.

The protuberance 144A is of truncated sector shaped configuration defining a pair of rectilinear radially oriented rim portions 308 and 310 that are integral with supplemental arcuate rim portion 312 and an interior cross rib portion 314 of similar arcuate and thickness configuration. Rim portion 312 and rib portion 314 are integral with membrane 148A that serves the same function as membrane 148 of diaphragm 30, with regard to blow out passages 78 and 106 of housing member 14A and back plate 24A, respectively.

The recess 86A includes elongated notch portion 150A that serves the same function as notch portion 150 of housing member recess 86; similarly recess 86A includes notch portion 152A that serves the same purpose as notch portion 152 of recess 86 (of housing member 14).

As to the back plate 24A, its recess 114A includes notch portions 154A and 156A that serve the same functions as the corresponding notches 154 and 156 of the back plate 24.

It will thus be seen that the gasket assembly 31A is applied to the gauge 10A in a manner similar to gauge 10, with the housing member 14A and back plate 24A being assembled against the diaphragm 30A in the manner indicated in FIG. 12, with the diaphragm 30A seated in the respective recesses 86A and 114A so that the aperture 304 defined by the diaphragm protuberance 142A is aligned with passages 76 and 96 of the gauge, and membrane 148A is seated between blowout passages 78 and 106 of the gauge 10A.

In the diaphragm 30A, the rimportion 120A including its protuberances 142A and 144A, segments 145A, and membrane 148A have the same relationship dimensions proportioningwise as the corresponding parts of the diaphragm 30. In the diaphragm 30A, wall 320 is integral with the diaphragm rim portions adjacent same and the rib 314 and has a thickness comparable to central portion 124A so that the diaphragm will be imperforate at this part of same.

The remaining component parts of the gauge 10A are similar or the same as the corresponding parts of gauge 10, as indicated by corresponding reference numerals.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. In a differential pressure gauge that includes an annular housing member having a front end and a back end, a front cover secured to the housing member front end in hermetically sealed relation thereto, a back plate secured to the housing member back end, with said housing member and said back plate defining a pressure cavity, a flexible diaphragm clamped between said housing member back end and said back plate and disposed across said pressure cavity and separating same into a high pressure chamber on the front side of said diaphragm and a low pressure chamber on the back side of said diaphragm, and including linear to rotary motion transforming means including a helix journaled in said housing member for rotation about its longitudinal axis, with the helix having an indicator connected thereto disposed adjacent and visible through said front cover, a magnet mounted in said high pressure chamber for producing rotational movement of said helix about its said axis in response to linear movement of the magnet alongside and lengthwise of said helix axis, with said helix axis extending longitudinally of said housing member, means for connecting said diaphragm to said magnet whereby deflection of the diaphragm under differential pressures in said chambers produces said linear movement of said magnet, said diaphragm having a marginal edging thereabout comprising a continuous sealing bead, with said housing member back end and said back plate respectively defining annular clamping surfaces between which said diaphragm bead is clamped for hermetically sealing said chambers from each other about said diaphragm, which surfaces are coextensive with said bead, and means for separately connecting said high and low pressure chambers to sources of high and low pressure fluids, respectively, the improvement wherein:

said means for connecting said high pressure chamber to the source of high pressure fluids comprises:

a high pressure passage formed in said housing member and having its inlet end aligned with said diaphragm bead at said clamping surface of said housing member back end and its outlet end communicating with said high pressure chamber, a high pressure passage formed in said back cover plate and having its inlet end adapted for connection to the source of high pressure fluid and its outlet end aligned with said inlet end of said housing member high pressure passage and said diaphragm bead at said clamping surface of said back plate, said bead being apertured between and being in sealing relation about said housing member high pressure inlet end and said back plate high pressure passage outlet end for communicating said back plate high pressure passage to said housing member passage through said bead in hermetically sealed relation to said chambers, said housing member having formed in same a blowout passage extending longitudinally of said housing member and having its inlet end communicating with said high pressure chamber and its outlet end aligned with said diaphragm bead at said clamping surface of said housing member at a location spaced from said bead aperture along said diaphragm marginal edge, said back plate having formed in same a blowout passage aligned with said housing member blowout passage and having its inlet end aligned with said housing member blowout passage and said diaphragm bead at said clamping surface of said back plate and its outlet end directed rearwardly of said back plate, said bead being in sealing relation about said housing member blowout passage outlet end and said back plate blowout passage inlet end and defining therebetween an impervious flangible membrane, said housing member and back plate high pressure passages and said diaphragm aperture communicating therebetween being similar in effective orifice area, said housing member and back plate blowout passages each having an effective orifice area that is a predetermined multiple of said effective orifice area of said housing member and back plate high pressure passages and said aperture therefor, said effective orifice area of said housing member and back plate high pressure passages and said aperture therefor being of rounded opening configuration aligned with said diaphragm bead, said effective orifice area of said housing member and back plate blowout passages being of elongate opening configuration that extends longitudinally of said bead for orienting same to have said predetermined area multiple as compared to said effective orifice area of said housing member and back plate passages within the confines of the hermetic sealing defined by said bead and said clamping surfaces.

2. The improvement set forth in claim 1 wherein:
said diaphragm bead at its said aperture and its said membrane is outwardly protuberant in the plane of said bead,
with said housing member and back plate clamping surfaces being shaped to complement said protuberances.

3. The improvement set forth in claim 2 wherein:
the portions of said housing member and back plate clamping surfaces that overlie said membrane each respectively define a pair of centering studs in centering relation to said membrane,
with said stud pairs being aligned longitudinally of said housing member and the studs of the respective pairs of studs being located adjacent the respective ends of the respective housing member and back plate blowout passage elongate opening configuration.

4. The improvement set forth in claim 1 wherein:
said housing member and its said clamping surface, said back plate and its clamping surface, and said diaphragm bead are of round configuration in coaxial relation about the same central axis that extends longitudinally of said housing member,
said elongate opening configuration of said housing member and back plate blowout passages and said diaphragm membrane being arced about said central axis.

5. The improvement set forth in claim 4 wherein:
said housing member and back plate high pressure passages are located substantially 180 degrees apart about said housing member, from said blowout passages thereof.

6. In a differential pressure gauge comprising a housing having a pressure cavity defined thereby across which is mounted a flexible diaphragm separating high and low pressure chambers in the gauge, a leaf spring disposed in said housing in overlying relation to said diaphragm and being anchored to said housing cantilever fashion at one end thereof, a wishbone frame disposed in said housing and having its arms anchored to said housing cantilever fashion to define a projecting bight portion, a helix journalled in said wishbone frame for rotation about its axis and being disposed so that its axis extends substantially normally of the plane of said leaf spring, means for connecting said diaphragm to said leaf spring, whereby deflection of the diaphragm under differential pressures in said chambers produces linear movement of said leaf spring other end, a magnet mounted on the leaf spring adjacent the other end of same and disposed in magnetic attraction relation to said helix for producing rotational movement thereof in response to said linear movement of said spring other end, an indicator fixed with respect to said helix, and means for separately connecting said high and low pressure chambers to sources of high and low pressure fluids, respectively, the improvement wherein:
said wishbone frame arms at their anchored ends are of reverse bend configuration each defining a lower foot that is anchored to said housing, a flexible leg that is upstanding from its foot, and a generally planar body portion overlying said foot,
with said body portions being in coplanar, parallel relation and being integrally united at their respective ends to form the wishbone frame bitht portion,
said wishbone frame bight portion journalling said helix with the axis thereof extending normally of the plane of said wishbone frame body portions,
said wishbone frame body portions being disposed on either side of and substantially paralleling said leaf spring,
said helix being formed to define a spindle portion coaxial with its said axis and one or more helically contoured flanges projecting radially thereof in spiralled relation thereto,
a dial plate mounted on said wishbone frame body portions in substantial parallel relation thereto,
said dial plate having scale indicia formed on the upwardly facing surface thereof that includes a datum zero,
said wishbone frame bight portion threadedly mounting a screw member paralleling said helix axis and having one end of same bearing against said housing,
said screw member including means for rotating same to set said pointer on said zero datum whereby said screw member forms the zero adjust device of said gauge.

7. The improvement set forth in claim 6 wherein:
said helix flanges define approximately a one-half turn about said helix axis.

8. The improvement set forth in claim 6 including:
an angle bracket mounting said magnet on said other end of said leaf spring,
said leaf spring other end projecting toward and being substantially centered with respect to said helix axis,
said angle bracket having one leg of same secured to said leaf spring one end in crosswise relation thereto and the other leg of same substantially paralleling said leaf spring and projecting below said wishbone frame bight portion,
said screw member being on one side of said helix axis and said angle bracket mounting said magnet on the opposite side of said helix axis.

9. The improvement set forth in claim 8 wherein:
said screw member, said helix axis and said magnet are approximately aligned in a plane that extends normally and transversely of the plane of said leaf spring.

10. The improvement set forth in claim 6 wherein said pointer comprises:
a U shaped frame member having one leg keyed to said helix, a second leg disposed above said wishbone bight portion through said helix axis, and a bight portion bypassing said wishbone bight portion,
and a pointer arm fixed to said pointer U shaped frame member second leg and disposed to overlie said dial plate,
with the mass of said pointer frame member balancing the mass of said pointer arm on either side of said helix axis.

11. The improvement set forth in claim 10 wherein:
said pointer arm is tubular in configuration.

* * * * *